United States Patent [19]

[11] 3,751,683

Drost

[45] Aug. 7, 1973

[54] COMBINED DATA AND SET-RESET FLIP-FLOP WITH PROVISIONS FOR ELIMINATING RACE CONDITIONS

[75] Inventor: Albertus Drost, Beekbergen, Netherlands

[73] Assignee: U.S. Philips Corporation, New York, N.Y.

[22] Filed: Feb. 17, 1972

[21] Appl. No.: 227,162

[30] Foreign Application Priority Data

Feb. 23, 1971 Netherlands ...................... 7102353

[52] U.S. Cl. ................ 307/218, 307/272, 307/289, 307/291, 328/92, 328/94, 328/206

[51] Int. Cl. ........................................ H03k 19/22

[58] Field of Search .................. 307/218, 272, 289, 307/291; 328/92, 94, 206

[56] References Cited

UNITED STATES PATENTS

| | | | |
|---|---|---|---|
| 3,075,091 | 1/1963 | Homan | 307/272 X |
| 3,163,772 | 12/1964 | Cray | 307/218 X |
| 3,339,089 | 8/1967 | Bergman | 307/218 X |
| 3,381,232 | 4/1968 | Hoernes et al. | 307/218 X |
| 3,458,825 | 7/1969 | Lagemann | 307/218 X |
| 3,484,700 | 12/1969 | Armstrong | 307/218 X |
| 3,510,787 | 5/1970 | Pound et al. | 307/272 X |
| 3,588,546 | 6/1971 | Lagemann | 307/291 |
| 3,612,911 | 10/1971 | Kroos | 307/218 X |

*Primary Examiner*—Stanley D. Miller, Jr.
*Attorney*—Frank R. Trifari

[57] ABSTRACT

A bistable multivibrator has input terminals for a reset, an information and a command signal. A first AND-gate and an OR-gate are cross-coupled to form a feedback loop. The reset input terminal is connected to an input of the first AND-gate. The information input terminal is connected to an input of a second AND-gate that has an output connected to an input of the OR-gate. The command input terminal is connected to inputs of both the first and second AND-gates. An inverter is inserted in the signal path between the command input terminal and the input of the OR-gate. These interconnections between the AND-gates and OR-gates reduces the possibility of "race" conditions developing within the bistable multivibrator.

9 Claims, 7 Drawing Figures

COMBINED DATA AND SET-RESET FLIP-FLOP WITH PROVISIONS FOR ELIMINATING RACE CONDITIONS

The invention relates to an integrated circuit, comprising at least three input terminals which are connected to inputs of logic gates, at least one feedback loop comprising logic gates, and at least one output terminal to which a signal of said loop can be applied. Circuits of this kind are often used for storing binary information. The feedback loop comprises a feedback mechanism which forms the output signals in conjunction with the signals on the input terminals. These output signals are then available for further processing. Various classes of bistable circuits can be distinguished, but for assembly to form a larger unit versatile circuits are preferably used, i.e., circuits which can perform a plurality of logic functions through various combinations of the input signals. This technique therefore limits the number of different types of circit necessary for forming such a larger unit. The invention provides a versatile circuit of this kind and is characterized in that of three input signals one reset signal can be applied to a first logic AND-gate inserted in said feedback loop. A first value of the reset signal controls the bistable circuit as a data flipflop. It is possible to apply an information signal and a command signal each to at least one logic gate outside the feedback loop, and therefrom to at least one logic gate forming part of said feedback loop. A first value of the information signal controls the circuit as a set-reset flipflop. The following state functon table is given for the data flipflop:

| C' | I | $Q_n$ |
|---|---|---|
| 1 | 0 | $Q_{n-1}$ |
| 1 | 1 | $Q_{n-1}$ |
| 0 | 0 | 0 |
| 0 | 1 | 1 |

The two input signals are the command signal C' (inverse of C) and the information signal I. $Q_{n-1}$ denotes the initial state of the bistable circuit, i.e., the state which is fed back by the loop and represents the output of the bistable circuit prior to the application of the input signals. $Q_n$ dnotes the final state. IF $Q_n = Q_{n-1}$, the previous state is stored. If C = 1, the bistable circuit assumes a state corresponding to the information signal. The circuit is in the memory state for C = 0. The table for the set-reset flipflop is:

| C' | R' | $Q_n$ |
|---|---|---|
| 1 | 0 | 0 |
| 1 | 1 | $Q_{n-1}$ |
| 0 | 0 | 1 |
| 0 | 1 | 1 |

The two input signals are now the command signal C' and the reset signal R', both of which are applied as inverted values. If R' = C' = 1, the stored information is retained; if R' and C' are not equal, the circuit assumes a state corresponding to the limit R'. If R' = C' = 0, the state is not defined in accordance with, for example, the convention given in R. Dokter and J. Steinhauer, Digitale Elektronik, Deutsche Philips G.m.b.H., Hamburg, 1969, Volume I, page 162. In the embodiments given by way of example, however, the "1"-state prevails.

The expression AND-gate is also to be understood hereinafter to mean a NAND-gate; this is actually the change-over from positive to negative logic, which has no consequences as regards the operation of the circuits.

A preferred embodiment according to the invention is characterized in that the information signal can be applied, together with the inverted value of the command signal, to a first additional logic AND-gate, one output of which is connected to a logic OR-gate forming part of the said loop. A first part of the logic result is thus applied to the loop in a simple manner.

An additional problem is formed by a certain disturbance, the race condition: this disturbance causes superfluous change-overs in the output signal if one input signal changes. If the signal appearing on an output terminal is formed by a logic combination of a number of logic sub-combinations, each of said logic sub-combinations being formed from a number of signals of the signal of the loop and said input signals together, the race condition disturbance is avoided as the invention is characterized in that, if the values of at least two of said sub-combination change in opposite senses under the influence of the changing of one of the said input signals, at least a third sub-combination is present which remains unaffected by the changing of said input signal. This third sub-comination keeps the value of the signal to be applied to said output terminal constant. The probelm set forth is thus eliminated by logic steps. The advantage thereof is that, for example, temperature fluctuations cannot exert an adverse effect. The said disturbance is caused in that a signal travels along two or more conductors, invalid states being temporarily realized in the static situation, for example, due to differences in delay times. In connection herewith, a preferred embodiment according to the invention is characterized in that said loop consists of a single, cyclic succession of logic gates, one output terminal of the bistable circuit being connected to the output of only one logic gate forming part of said feedback loop. Each output terminal receives only a single signal, the said disturbance thus being avoided in the feedback loop.

Another preferred embodiment according to the invention is characterized in that said feedback loop comprises at least three logic gates, i.e., a cyclic connection of successively the first logic AND-gate, a first logic OR-gate, and a second logic AND-gate. Due to the construction of the feedback loop using at least three logic gates, a plurality of points for supplying signals exist, so that the number of possible logic combinations is substantially increased.

In a further preferred embodiment according to the invention the information signal can be applied, together with the inverted value of the command signal, to a first additional logic AND-gate, one output of which is connected to a logic OR-gate forming part of said loop, the invention being characterized in that the command signal can be applied, together with the information signal, to a second logic OR-gate, one output of which is connected to the said second logic AND-gate. As a result, the said disturbance is also avoided in relation with the information signal and the command signal.

A further advantageous embodiment according to the invention is characterized in that said second logic OR-gate receives the information signal and the command signal via a second and a third additional logic AND-gate, respectively, the said first and second OR-gates being constructed as wired-OR-gates. Due to the construction of the OR-gates as wired-OR-gates, a simplified circuit is obtained as the wired-OR-gates can be obtained by an internal interconnection of the preceding logic AND-gates. Moreover, the same type can then be chosen for all other logic gates, which simplifies the manufacture.

A further preferred embodiment according to the invention is characterized in that said second logic AND-gate is constructed as a wired-AND-gate. The construction of this AND-gate as a wired-AND-gate offers a further simplification of the circuit: a wired-AND-gate of this kind can be readily realized by connecting the outputs of two or more logic AND-gates having active circuit elements. These AND-gates may also be internally connected so as to realize a logic OR-function. Next to the simplicity of construction, all wired gates also offer the additional advantage that virtually no dissipation occurs.

A further preferred embdiment yet according to the invention is characterized in that the signal of said loop can be applied to at least one logic AND-gate which forms, next to said loop, an output gate and which furthermore receives a blocking signal by means of which the signal on the output of said at least one output gate can be blocked. The blocking of a logic output signal by an AND-gate receiving a blocking signal is known, but by combining said selection facility between the operation as a data flip-flop or as a set-reset flipflop and the provision of a blocking facility of the output signal, an extremely large number of combinations is realzed, while the circuit remains reasonably simple and still dissipates so little energy that simple cooling methods suffice, such as, for example, convection of air at low velocity.

A next preferred embodiment according to the invention is characterized in that the total number of input and output terminals for logic signals amounts to thirteen. Integrated circuits of this kind are manufactured on standardized modules. By choosing a suitable configuration, very versatile possibilities of use are realized. For example, a bistable circuit may be chosen having one information input terminal, three command input terminals, three reset terminals, two blocking input terminals and four output terminals. Another possibility, for example, is to choose two bistable circuits having a different arrangement of terminals.

In order that the invention may be readily carried into effect, some embodiments thereof will now be described in detail, by way of example, with reference to the accompanying diagrammatic drawings, in which.

Figures 1, 2, 3:
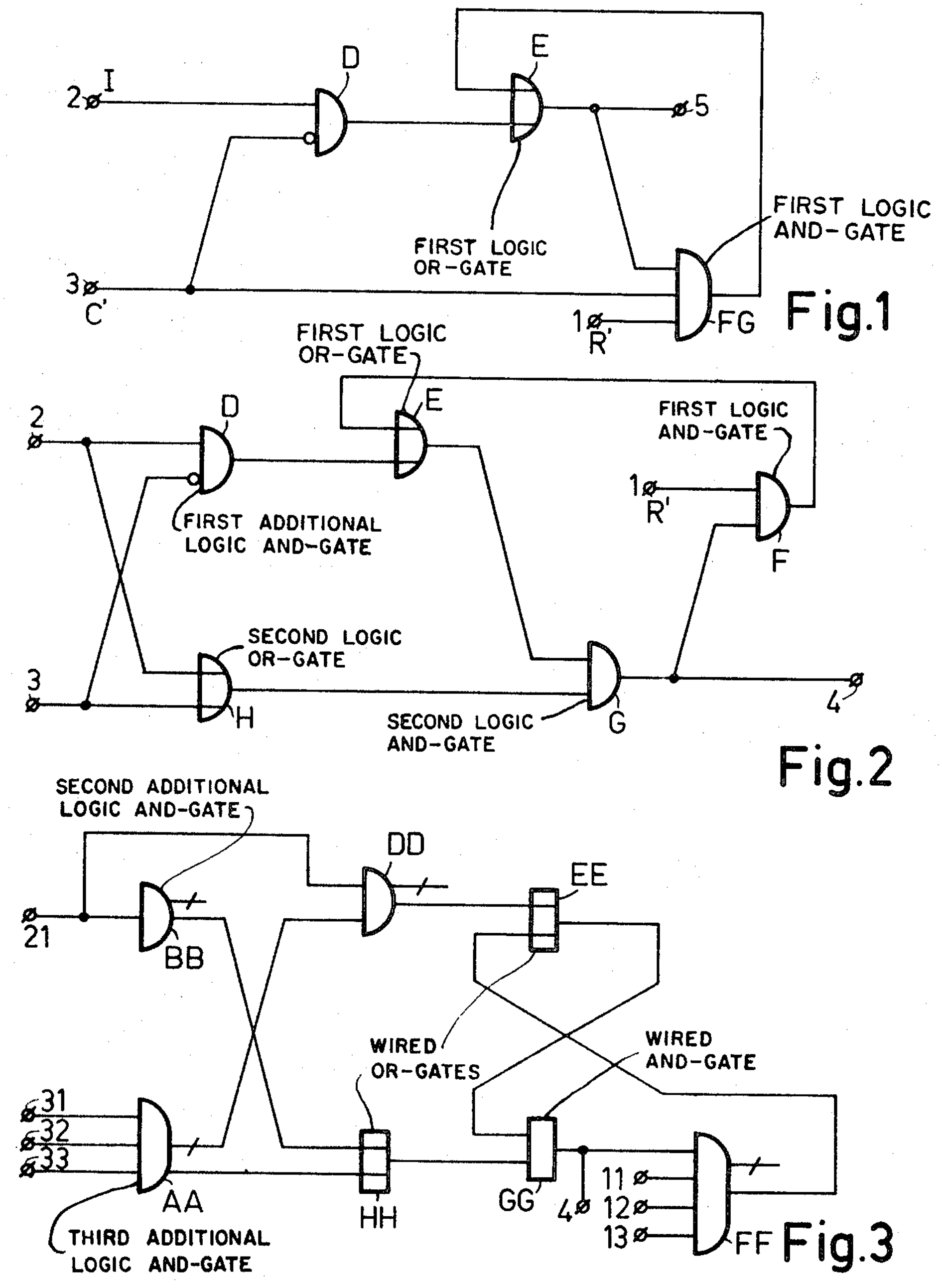
FIG. 1 shows a simple embodiment of a bistable inegrated circuit according to the invention.
FIG. 2 shows another embodiment provided with protection means against the disturbance caused by race.
FIG. 3 shows a more complex embodiment of the circuit shown in FIG. 2.

FIG. 1 shows a simple embodiment of an integrated bistable circuit according to the invention. The circuit comprises three input terminals for logic signals 1, 2 and 3, one feedback loop comprising a logic AND-gate FG and a first logic OR-gate E, an output terminal for logic signals 5, and a logic AND-gate D. The terminal 1 receives the reset signal R′, terminal 2 receives the information signal I, and terminal 3 receives the command signal C′. The AND-gate D receives the signal of terminal 3 in an inverted form, which is denoted by a circle. The following logic signals appear:

| | terminal or logic gate | | resultant signal |
|---|---|---|---|
| | 1 | | R′ |
| | 2 | | I |
| | 3 | | C′ |
| | D | I.C″ = I.C. | |
| | E | D + FG = I.C. + FG | |
| | FG | | E.C.′.R′ |
| So | E (= terminal 5) | | I.C. + E.C′ . R′ |

The plus sign denotes an OR-function and a dot (.) denotes an AND-function. This bistable circuit operates as a data flipflop and as a set-reset flipflop. For a first value of the reset signal it operates as a data flipflop (R′ = 1) and for a first value of the information signal (I = 1) it operates as a set-reset flipflop.

On the other hand, disturbances may occur, which can be explained as follows: assume that R′ = 1, I = 1, C′ = 0, so that the output supplies a 1. If C′ becomes 1 and the delay time between terminal 3 and the gate FG is sufficiently small, FG becomes high (1), and hence E becomes high, so that the 1 remains stored. However, where the delay time between terminal 3 and the gate FG is larger than the delay time between terminal 3 and the gate E, if C′ = 1, (i.e., C = 0), the gate D becomes low (0) and the gate E also becomes low (because the output of FG was previously also low), the output of E becomes low and hence the output of gate FG remains low, even if C′ becomes also high: information has thus been destroyed. This example illustrates the "race" problem.

This can be readily understood by considering the result of gate E given in the table (simplified):

$$E = C + E.C'.$$

If the second term is not yet 1 when the first term already becomes zero, it is impossible that a 1 is stored. Similarly, it may be assumed that C′= 1 and E = 1, while C′ then becomes 0. If the electrical relaziation (for example, voltage) of C on the output becomes 1 (high) before that of C′. E, the output remains 1 (high); otherwise it briefly becomes 0 (low).

Consequently, two electrical possibilities exist: in the first case D may quickly become high (1), making the output of E and the circuit output on terminal 5 high. On the other hand, C′ may become 0, so that FG supplies a 0 which arrives at E. The other input of E is still low, so that terminal 5 becomes low. Slightly later D becomes high, so that E also becomes high again.

Apart from the two said disturbances, a third type of disturbance exists. This disturbance consists in that three change-overs from 0 to 1 occur if one input signal changes. This is known as the "dynamic race" disturbance: a disturbance is superimposed on a "true" changeover of the output signal. We previously discussed the "static race" disturbance: a disturbance is superimposed on a non-changed output signal. Before that we described the destruction of information which has the most adverse effect. The race disturbance loses its effect after some time, so that a logic system operates even if a disturbance of this kind is present, be it slowly, because after each logic operation a waiting period is required to allow the race disturbances to disappear.

FIG. 2 shows another embodiment of a bistable circuit according to the invention, comprising in addition to the already mentioned components, a second logic OR-gate H and a feedback loop having a first logic AND-gate F, the first logic OR-gate E, and a second logic AND-gate G, to which an output terminal 4 is connected. The gates D, F and H act as input gates. The following logic signals occur:

| terminal or logic gate | resultant signal |
|---|---|
| 1 | R′ |
| 2 | I |
| 3 | C′ |
| D | I.C. |
| H | I + C′ |
| E | F + I.C |
| G | H.E. = (I + C′).(F+I.C) |
| F | G.R.′ |
| E | G.R′ + I.C |
| G | (I+C′).(G.R′+I.C) = I.G.R′(1) + I.C(2) + G.C′.R′(3) + I.C.C′) (4). |

The fourth term (I.C.C′) of the four terms is always 0.

The following combinations of signals can occur.

| | I | R | C | G | value of the logic terms first | second | third | together |
|---|---|---|---|---|---|---|---|---|
| 1 | 0 | 0 | 0 | 0 | 0 | 0 | 0 | 0 |
| 2 | 0 | 0 | 0 | 1 | 0 | 0 | 1 | 1 |
| 3 | 0 | 0 | 1 | 0 | 0 | 0 | 0 | 0 |
| 4 | 0 | 0 | 1 | 1 | 0 | 0 | 0 | 0 |
| 5 | 0 | 1 | 0 | 0 | 0 | 0 | 0 | 0 |
| 6 | 0 | 1 | 0 | 1 | 0 | 0 | 0 | 0 |
| 7 | 0 | 1 | 1 | 0 | 0 | 0 | 0 | 0 |
| 8 | 0 | 1 | 1 | 1 | 0 | 0 | 0 | 0 |
| 9 | 1 | 0 | 0 | 0 | 0 | 0 | 0 | 0 |
| 10 | 1 | 0 | 0 | 1 | 1 | 0 | 1 | 1 |
| 11 | 1 | 0 | 1 | 0 | 0 | 1 | 0 | 1 |
| 12 | 1 | 0 | 1 | 1 | 1 | 1 | 0 | 1 |
| 13 | 1 | 1 | 0 | 0 | 0 | 0 | 0 | 0 |
| 14 | 1 | 1 | 0 | 1 | 0 | 0 | 0 | 0 |
| 15 | 1 | 1 | 1 | 0 | 0 | 1 | 0 | 1 |
| 16 | 1 | 1 | 1 | 1 | 0 | 1 | 0 | 1 |

This table shows that the first term I.G.R′ is redundant in a static situation: the first term is "true" on the 10th and the 12th line, which are also rendered "true" by the 3rd and the 2nd term, respectively. In a dynamic situation the first term is not redundant. Assume that I= G = R′ = 1 and C = 1: the second term is then true. If C = 0, the second term can become true in an electrical sense only after the first term has become false: the result is then a logic zero during a brief period. The term I.G.R′, however, then performs the role of the additional logic sub-combination which keeps the result constant when the value of C′ changes. This is because the output signal changes only after the logic state of the loop formed by the gates G, F and E has adapted itself to the new signal to be given.

The output 4 is thus protected against the transfer of very brief signals which are internally blocked. This is exactly expressed by the term I.G.R′ which is to be ignored in a static consideration. If the circuit is used as a data flipflop, R′ is 1. It can be demonstrated as follows that the circuit is protected against the described brief disturbances. Assume that I = 1 and C = 0, while the value zero is stored in the circuit (ninth line of the table). If I changes from 1 to 0, the first line of the table is ignored and the output remains unchanged. If the circuit were in the 1-state, it also remains unchanged (10th and 2nd line, respectively, of the table). Assuming that C = 1 (and R = 0), the output signal becomes equal to the information signal (I) after some time. Assume that the value of I changes from 0 to 1 after a rest period (i.e., G = 0). Consequently, H becomes 1 and so do D (and E) and hence both inputs of G and slightly later also F and the other input of E. However, the output signal becomes high only if both gates E and H supply a 1. For example, if H were to become high but D were to react later, the output would be changed only by the delayed signal of D. The same applies if I becomes 0 again after having been 1 for some time.

The first signal which reaches the gate G via E or H causes the output signal to change, without the delay time of the other signal having an effect. The changeover of the signal C′ from 0 to 1 does not cause a changeover of the output signal. Assuming that I was 1 (so the output of G = 1), H remains high and a changeover of D (from 1 to 0) is blocked at E by the output signal (R′ = 1). However, if I was O, G was O as both inputs of H were zero, and also both inputs of E. Due to the fact that C′ becomes 1, H becomes 1, but D remains 0 and so does G via the existing situation of the feedback loop. If C′ changes over from 1 to 0 and the bistable circuit had already stored the signal, the latter reasoning can be reversed.

Assume that the "wrong" information was stored. For example, R′ = 1, I = 1, output signal is 0, and C′ changes over from 1 to 0. H continuously supplies a 1. D then becomes 1 and the state of the loop changes to 1. Conversely, if I = 0 and the state of the loop is 1, the following occurs: A is and remains 0, and only the change-over of H is of importance. The "race-free" can thus be realized because in situations where two signals cooperate a reaction takes place only to the last signal arriving, while in the other situations only one logic path exerts an effect.

On the other hand, approximately simultaneous change-overs of two or more input signals may result in a plurality of change-overs, but this cannot be counteracted and this is not the object of the invention either. The object is merely to avoid disturbances caused by internal differences in delay times and/or response thresholds of logic functions. Consequently, the separation in time of change-overs of the input signals must satisfy given requirements. This will not be elaborated upon in this context.

Accordingly, a first value of the information signal I = 1 results in operation as a set-reset flipflop (S R flipflop). Therefore, the following eight combinations of input signals are possible:

| I | R | C | $Q_n$ | Class | |
|---|---|---|---|---|---|
| 0 | 0 | 0 | $Q_{n-1}$ | D | |
| 0 | 0 | 1 | 0 | D | |
| 0 | 1 | 0 | 0 | | |
| 0 | 1 | 1 | 0 | | |
| 1 | 0 | 0 | $Q_{n-1}$ | D | RS |
| 1 | 0 | 1 | 1 | D | RS |
| 1 | 1 | 0 | 0 | | RS |
| 1 | 1 | 1 | 1 | | RS |

The classifications partly overlap each other, while two combinations of input signals do not belong to a given class. However, sometimes these can still be used.

The bistable circuit according to the invention is specially designed for construction as an integrated circuit. Therefore, only one type of logic gate is used, composed of active components. Furthermore, a number of logic functions is often realized by direct galvanic connections, the so-termed "wired-OR-gates" and "wired-AND-gates." The advantage of the use of these gates is that therein energy losses occur exclusively in conductors and, moreover, that the realization of the logic function is effected substantially without delay as the beginning and the end, respectively, of a conducting state occur instantaneously.

Also taking into account these considerations, FIG. 3 shows a more detailed diagram of a bistable circuit according to the invention, which in this embodiment comprises seven input terminals for logic signals, i.e., 11, 12, 13, 21, 31, 32 and 33, a feedback loop comprising a first logic AND-gate FF, a first logic wired-OR-gate EE, and a second logic wired-AND-gate GG, to which an output terminal 4 is connected. The circuit furthermore comprises a second logic wired-OR-gate HH, a first additional logic AND-gate DD, a second additional logic AND-gate BB, and a third additional logic AND-gate AA. The third additional logic AND-gate AA combines three signals to form the signal C'. Similarly, the signals arriving on the terminals 11, 12 and 13 are combined to form the signal R'. The logic gates can be used in the circuit in different manners. They supply complementary signals on their two outputs, the inverted output being denoted by a lateral stroke.

Figure 4:
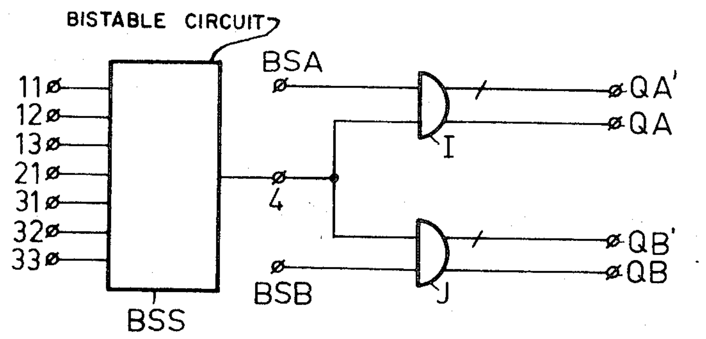
FIG. 4 shows an integrated bistable circuit having buffered outputs and thirteen input and output terminals for logic signals.

FIG. 4 shows an embodiment of a bistable circuit according to the invention, having a so-termed "buffered output." The circuit comprises a bistable circuit BBS, for example, that shown in FIG. 3, having input terminals 11, 12, 13, 21, 31, 32 and 33 and an output terminal 4, and furthermore comprising two further input terminals BSA and BSB, two logic AND-gates I and J, and four signal output terminals QA, QA', QB and QB'. As a result of blocking signals on one or two of the input terminals BSA and BSB, the information present on the output terminal 4 is available on the corresponding output terminal QA, QA', QB or QB', both in a non-inverted (terminals QA and QB) and in an inverted form (terminals QA' and QB'). As a result, the bistable circuit can be used in a variety of manners. For example, the output can be blocked during changeovers of the signal on the output terminal 4, and synchronization can be obtained when the bistable circuit is used in a larger apparatus. As a result, an additional logic stage is already incorporated in the bistable circuit.

Figure 5:
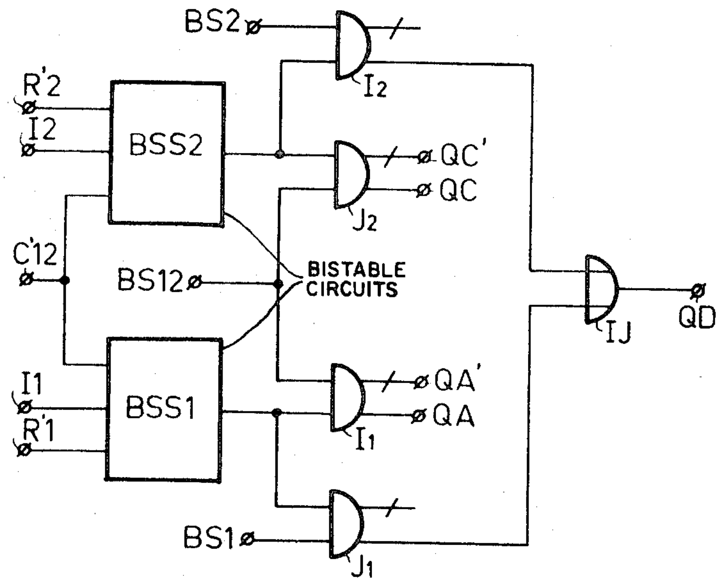
FIG. 5 shows an integrated circuit consisting of two bistable integrated circuits as shown in FIG. 4, having thirteen input and output terminals for logic signals.

FIG. 5 shows an extension of FIG. 4 which can be used for mounting on a similar normalized module. Two bistable circuits are present, BSS1 and BSS2, for example, as shown in FIG. 3. Also provided are the logic signal terminals C'12, R'1, R'2, BS1, BS2, BS12, I1, I2, QA, QA', QC, QC', QD. A number of logic signal terminals have been combined so that the total number of terminals amounts to 13 again. The buffer stage is composed of four logic AND-gates I1, I2, J1 and J2, and a logic OR-gate IJ. The terminals I1 and I2 receive information signals, terminal C'12 receives a common command signal, and terminals R'1 and R'2 receive reset signals. Furthermore, the terminals BS1 and BS2 receive blocking signals and the terminal BS12 receives a common blocking signal. The terminal QD supplies a common output signal, the terminals QA and QA', and QB and QB', respectively, supply separate output signals, the latter signals being supplied both in the non-inverted and in the inverted form. In the foregoing, inverted outputs are always provided with a lateral stroke.

Figure 6:
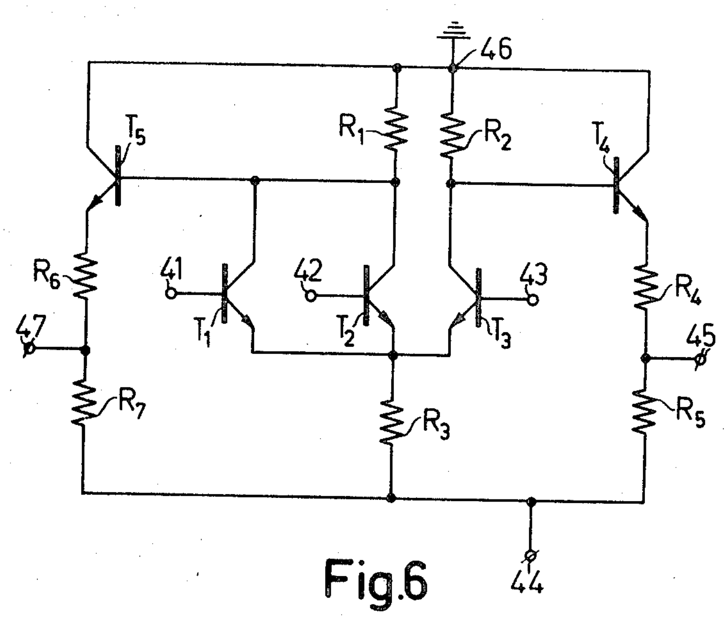
FIG. 6 shows a logic AND-gate composed of active components.

FIG. 6 shows a logic AND-gate composed of active components. The circuit comprises five transistors T1, T2, T3, T4 and T5, seven resistors R1, R2, R3, R4, R5, R6, R7, two signal input terminals 41 and 42, two voltage terminals 43 and 44, two signal output terminals 45 and 47, and a grounding terminal 46. The supply voltage on terminal 44 is, for example, −5.2 volts. The voltage on the grounding terminal is 0 volts. The voltage on terminal 43 is −1.25 volts. Negative logic is used, a logic, zero, being defined as a voltage level of −0.8 volts, and a logic "one" being defined as a voltage level of −1.6 volts. If both signal input terminals 41 and 42 receive a logic 1 (−1.6 volts), the transistors T1 and T2 are cut off so that the emitter electrodes of the transistors T1, T2 and T3 have a low voltage: consequently, the potential of the voltage terminal 43 is comparatively high so that transistor T3 is conducting and the base electrode of transistor T4 becomes low due to the voltage drop across the resistor R2. The current passed by the transistor T3 to the resistor R3 is not so large that the voltage drop across the resistor R3 influences the state of the transistors T1 and T2. Due to the low voltage on the base electrode of the transistor T4, this transistor is cut off so far that the voltage on the signal output terminal becomes approximately −1.6 volts again, which is also due to the proportioning of the resistors R4 and R5. Transistor T4 is thus connected as an emitter-follower. If one of the two signal input terminals receives a logic zero (−0.8 volts), the associated transistor(s) (T1 and/or T2) becomes conducting and the emitter electrodes of the transistors T1, T2 and T3 receive a comparatively high voltage with respect to the voltage on terminal 43, so that transistor T3 is cut off and the base electrode of the transistor T4 has a comparatively high voltage. As a result, T4 becomes conducting such that the voltage on the signal output terminal 43 becomes approximately −0.8 volts due to the voltage drop across the resistor R5. In this way the logic AND-function is realized, the output signal being available on the signal output terminal 45 in a non-inverted form.

If both transistors T1 and T2 are cut off (two logic "ones" on the signal input termimals 41 and 42), the collector electrodes of transistors T1 and T2 are high so that transistor T5 has a high voltage on its base electrode and hence is conducting. As a result, the voltage on the signal output electrode becomes approximately −0.8 volts, so that it supplies a logic, zero. If one of the two transistors T1 and T2 is conducting, the base electrode voltage of the transistor T5 becomes lower and T5 becomes less conducting. As a result, the voltage on the signal output terminal 47 decreases to −1.6 volts (logic "one"). The output signal is then available on this terminal in an inverted form.

The wired-AND-gate used in FIG. 3 is formed by interconnecting the signal output terminals 45 of two logic AND-gates as shown in FIG. 6. If a logic, 1 is present on both output terminals, this also applies to the combination. If one of the two has a logic, zero (−0.8 volts), the impedance formed by the associated transistor T4 is small, whilst this impedance may be in parallel with the larger impedance of the transistor T4 of a logic AND-gate having an output signal, 1. The parallel impedance is then determined by the conducting transistor T4 and the output signal thus produces a logic, zero. The wired-AND-function is thus realized. If both output transistors T4 are conducting, the current will be doubled, and hence the voltage. In this case the voltage must be normalized, which is effected, for example, automatically in that the setting of the transistor T4 is slightly changed. For the inverted signal the wired-AND-gate can be realized in the same manner by interconnecting two signal output terminals 47.

Figure 7:
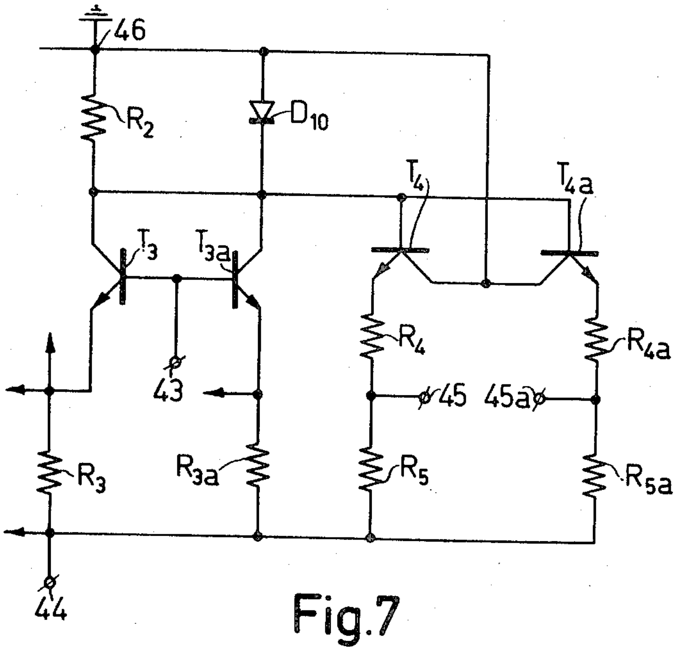
FIG. 7 shows the realization of a wired-OR-gate by means of two logic AND-gates as shown in FIG. 6.

The wired-OR-function is realized by removing the resistor R2 of one of the two logic AND-gates concerned and by interconnecting the collector electrodes of the transistors T3, so that both are connected to the earthing terminal 46 via one resistor R2. This is shown in FIG. 7 for two bistable circuits according to FIG. 6, the left-hand portion of FIG. 6 being omitted in FIG. 7, i.e., the transistors T1, T2, T5, the resistors R1, R6, R7, the signal input terminals 41 and 42, and the signal output terminal 47. The elements of the second bistable circuit are denoted by the letter *a* and the connections to the omitted components are denoted by arrows. If both transistors T3 and T3*a* are cut off, the base electrodes of the transistors T4 and T4*a* have a high voltage, so that they can be rendered conducting such that the voltage on the signal output terminals becomes approximately −0.8 volts (logic zero). If one of the transistors T3 and T3*a* becomes conducting, the voltage on the base electrodes of the transistors T4 and T4*a* becomes low so that they become less conducting and the voltage on the signal output terminals 45 and 45*a* decreases to −1.6 volts (logic 1). If both transistors T3 and T3a are conducting, the voltage on the base electrodes of the transistors T4 and T4a would become lower yet, were it not that this voltage cannot become lower than the level at which the diode D10 starts to conduct current, which is the case at a voltage drop of approximately −0.8 volts. The wired-OR-function is thus realized. An analogous description applies to the inverted value. For this purpose one of the resistors R1 is removed, the collector electrodes of the transistors T2 and T2*a* are connected (not shown) and a diode is added. It is obvious that in FIG. 7 the transistor T4*a* and the resistors R4*a* and R5*a* may be omitted without loss. Furthermore, more signal input terminals may be used and more gates may be connected in parallel. It is also possible to interchange the designations of the logic 1 and 0, so that the logic functions are also called differently. Furthermore, a plurality of modifications in the logic gate is possible. It is also possible to generate a wired-OR-function internally between two logic gates and to use the output for a wired-AND-function. The reverse, however, is not possible, which demonstrates that in FIGS. 1 to 3 logic gates cannot be replaced by wired-AND/OR-functions. This explains the function of the logic AND-gate BB, because the logic OR-function is then realized according to FIG. 7. It is obvious that the AND-gate AA offers the advantage that the output signal is available both in an inverted and in a non-inverted form. Moreover, use can then be made of a plurality of input terminals 31, 32, 33, so that a plurality of functions can be realized. The circuit of FIG. 4 comprises 13 terminals for logic signals, three terminals for the supply voltage of −5.2 volts, the reference voltage of −1.2 volts and the earthing level of 0 volts. The total number of 16 terminals is that of a known standard module.

The invention can be readily extended. The number of logic gates can be increased so that a plurality of possibilities arises for wired gates. In particular, in the FIGS. 3, 4 and 5 other configurations of the various terminals may be chosen, and the FIGS. 6 and 7 are also given merely by way of example.

What is claimed is:

1. A bistable circuit, comprising a reset input terminal, an information input terminal, a command input terminal, an output terminal, a first AND-gate, an OR-gate, means for cross-coupling the first AND-gate and the OR-gate thereby forming a feedback loop, means connecting the reset terminal to an input of the first AND-gate, a second AND-gate, means connecting the information terminal to an input of the second AND-gate, means connecting the output of the second AND-gate to an input of the OR-gate, means connecting the output terminal of the bistable circuit to the feedback loop, means connecting the command signal to an input of both the first and second AND-gates thereby forming a signal path between the command input terminal and the input of the OR-gate, and an invertor connected in the signal path between the command input terminal and the OR-gate.

2. A circuit as claimed in claim 1, wherein the means for cross-coupling the first AND-gate and the OR-gate comprises a third AND-gate having an input connected to an output of the OR-gate and having an output connected to an input of the first AND-gate, and wherein the means connecting the control input terminal to input terminals of the first and second AND-gates comprises means connecting the control input terminal to an input terminal of the third AND-gate.

3. A bistable circuit as claimed in claim 2, wherein the means connecting the control input terminal to an input terminal of the third AND-gate comprises a second OR-gate means connecting an input the second OR-gate to the control input terminal, and means connecting an output of the second OR-gate to an input of the third AND-gate, the bistable circuit further comprising means connecting the information input terminal to an input terminal of the second OR-gate.

4. Apparatus as claimed in claim 3, wherein the means connecting the control input terminal to an input terminal of the second OR-gate comprises a fourth AND-gate, means connecting the control input terminal to an input of the fourth AND-gate, and means connecting an output of the fourth AND-gate to an input of the second OR-gate.

5. A bistable circuit as claimed in claim 4, wherein the means connecting the control input terminal to inputs of the first and second AND-gates comprises means connecting an output of the fourth AND-gate to an input of the second AND-gate.

6. A bistable circuit as claimed in claim 5, wherein the means connecting the information input terminal to an input of the second OR-gate comprises a fifth AND-gate, means connecting the information input terminal to an input of the fifth AND-gate, and means connecting an output of the fifth AND-gate to an input of the second OR-gate.

7. Apparatus as claimed in claim 2, wherein the third AND-gate comprises a wired AND-gate.

8. Apparatus as claimed in claim 3, wherein the first and second OR-gates each comprise a wired OR-gate.

9. A bistable circuit, comprising a reset input terminal, an information terminal, a control input terminal, a first AND-gate having an input connected to the reset input terminal, a first OR-gate, means connecting the output of the first AND-gate to an input of the first OR-gate, a second AND-gate, means connecting an output of the first OR-gate to an input of the second AND-gate, means connecting an output of the second AND-gate to an input of the first AND-gate, the first and second AND-gates and the first OR-gate thereby forming a feedback loop, an output terminal connected to an output of the second AND-gate, a third AND-gate, means connecting an output of the third AND-gate to an input of the first OR-gate, means connecting the information input terminal to an input of the third AND-gate, invertor means connecting the control input terminal to an input terminal of the third AND-gate, a second OR-gate, means connecting separate inputs of the second OR-gate to the information input terminal and to the control input terminal, and means connecting the output of the second OR-gate to an input of the second AND-gate.

* * * * *